(12) United States Patent
Hickey (10) Patent No.: US 10,250,335 B2
(45) Date of Patent: Apr. 2, 2019

(54) PHOTONIC INTEGRATED CHIP DEVICE HAVING A COMMON OPTICAL EDGE INTERFACE

(71) Applicant: RANOVUS INC., Ottawa (CA)

(72) Inventor: Ryan Murray Hickey, Stittsville (CA)

(73) Assignee: RANOVUS INC., Ottawa, Ontario (CA)

( * ) Notice: Subject to any disclaimer, the term of this patent is extended or adjusted under 35 U.S.C. 154(b) by 0 days.

(21) Appl. No.: 15/703,399

(22) Filed: Sep. 13, 2017

(65) Prior Publication Data

US 2018/0091233 A1 Mar. 29, 2018

Related U.S. Application Data

(60) Provisional application No. 62/398,757, filed on Sep. 23, 2016.

(51) Int. Cl.
| | |
|---|---|
| *H04J 14/02* | (2006.01) |
| *H04B 10/70* | (2013.01) |
| *H04B 10/275* | (2013.01) |
| *H04B 10/278* | (2013.01) |
| *H04J 14/06* | (2006.01) |
| *G02B 6/12* | (2006.01) |
| *G02B 6/293* | (2006.01) |

(52) U.S. Cl.
CPC ......... *H04B 10/70* (2013.01); *G02B 6/12007* (2013.01); *H04B 10/275* (2013.01); *H04B 10/278* (2013.01); *H04J 14/0201* (2013.01); *H04J 14/06* (2013.01); *G02B 6/29341* (2013.01); *G02B 6/29395* (2013.01); *G02B 2006/12164* (2013.01)

(58) Field of Classification Search
CPC ... H04B 10/70; H04B 10/275; H04J 14/0201; H04J 14/06
See application file for complete search history.

(56) References Cited

U.S. PATENT DOCUMENTS

2001/0028769 A1* 10/2001 Deacon ............... G02B 6/1228
385/50
2006/0056002 A1 3/2006 Wooten et al.
(Continued)

FOREIGN PATENT DOCUMENTS

EP 2942886 A1 11/2015

OTHER PUBLICATIONS

EPO, Extended European Search Report, dated Feb. 2, 2018, re European Patent Application No. 17191787.5.

*Primary Examiner* — Dzung D Tran
(74) *Attorney, Agent, or Firm* — Perry + Currier, Inc.

(57) ABSTRACT

A photonic integrated chip device having a common optical edge interface is provided and specifically a device comprising: a photonic integrated circuit (PIC) chip comprising: an optical circuit; and an electrical interface configured to receive electrical signals for controlling the optical circuit; and, a common optical interface side of the PIC chip comprising: at least one input configured to receive light into the PIC chip to the optical circuit; and at least one output configured to convey at least one optical signal from the optical circuit out of the PIC chip, the electrical interface located on one or more electrical interface sides of the PIC chip different from the common optical interface side.

11 Claims, 5 Drawing Sheets

(56) References Cited

U.S. PATENT DOCUMENTS

2015/0323743 A1* 11/2015 Nicholson ............ H04B 10/506
                                                              385/14
2017/0085324 A1* 3/2017 Rylyakov ............... H04B 10/58
2018/0031873 A1* 2/2018 Kim ..................... G02B 6/2746

* cited by examiner

PHOTONIC INTEGRATED CHIP DEVICE HAVING A COMMON OPTICAL EDGE INTERFACE

CROSS-REFERENCE TO RELATED APPLICATION(S)

This application claims priority from U.S. Provisional Patent Application No. 62/398,757, filed Sep. 23, 2016, which is incorporated herein by reference.

FIELD

The specification relates generally to telecommunication devices, and specifically a photonic integrated chip device having a common optical edge interface.

BACKGROUND

Multiplexed optical transmit assemblies used in telecommunications devices generally have electrical inputs on one side that control modulators that modulate light from a plurality of laser diodes, one laser diode for each frequency modulated by the multiplexed optical transmit assembly. Alternatively, optical assemblies used in telecommunications devices generally have electrical inputs on one side that can control other types of optical devices that can one or more of filter light from the laser diodes, switch light from the laser diodes from the laser diodes, attenuate light from the laser diodes, control polarization of light from the laser diodes, etc. The laser diodes are generally on a same side as the electrical inputs, such that optical input to the modulators are on a same side as the electrical inputs. Optical inputs of the assemblies are on an opposite side of the assemblies as the optical outputs. Having the electrical inputs and the light inputs to the optical devices on a same side result in a bulky package that can be challenging to integrate with other telecommunication equipment and/or must be designed around.

SUMMARY

The present specification provides a device that includes a photonics integrated circuit (PIC) that comprises a common optical interface side that includes both at least one optical input and at least one optical output, and an electrical interface located at one or more electrical interface sides different from the common optical interface side for example opposite and/or adjacent the common optical interface side etc. The at least one optical input and the at least one optical output act as interfaces to an optical circuit of the PIC. The at least one optical input and the at least one optical output can be optically joined and/or in optical communication with each other using a PIC optical bus and/or waveguide there between. The device further includes an optical circuit, which can include, but is not limited to, one or more optical ring resonators on the optical bus; the optical circuit receives light and/or one or more optical signals from the at least one optical input, and the at least one optical output conveys one or more optical signals and/or one or more modulated optical signals from the optical circuit (e.g. the one or more optical ring resonators) out of the device. The optical circuit can, alternatively, include one or more of filter the optical signal, switch the optical signal, change the polarization of the optical signal, and the like. Hence the optical output can convey filters optical signals, switched and/or combined optical signals, a changed polarized optical signal and/or an altered optical signal out of the device. As the at least one optical input and at least one optical output are on the same common optical interface side, and the electrical interface is located on one or more sides different from the common optical interface side, the optical components interacting with the device do not physically interfere with electrical components interacting with the device. In particular, the electrical interface can be located on one or more of: an electrical interface side of the PIC chip opposite the common optical interface side; in yet further implementations; and an electrical interface side of the PIC chip adjacent the common optical interface side. In addition, as the at least one optical input and at least one optical output are on the same common optical interface side, the device can comprise a common optical edge interface. In other words, the at least one optical input and the at least one optical output can be located on a common edge of a PIC chip.

Furthermore, as light can be produced by a laser that can produce a plurality of optical signals at different frequencies, for example a Fabry-Perot laser, the optical circuit of the device can comprise a plurality of optical ring resonators, for example one for each of the plurality of optical signals. Hence, the device can be made even less bulky than prior art multiplexed optical transmit assemblies as the device can have one optical input, one optical output on a same side, and the electrical interface that controls the optical ring resonators on one or more different sides.

In this specification, elements may be described as "configured to" perform one or more functions or "configured for" such functions. In general, an element that is configured to perform or configured for performing a function is enabled to perform the function, or is suitable for performing the function, or is adapted to perform the function, or is operable to perform the function, or is otherwise capable of performing the function.

Furthermore, as will become apparent, in this specification certain elements may be described as connected physically, electronically, or any combination thereof, according to context. In general, components that are electrically connected are configured to communicate (that is, they are capable of communicating) by way of electric signals. According to context, two components that are physically coupled and/or physically connected may behave as a single element. In some cases, physically connected elements may be integrally formed, e.g., part of a single-piece article that may share structures and materials. In other cases, physically connected elements may comprise discrete components that may be fastened together in any fashion. Physical connections may also include a combination of discrete components fastened together, and components fashioned as a single piece.

It is understood that for the purpose of this specification, language of "at least one of X, Y, and Z" and "one or more of X, Y and Z" can be construed as X only, Y only, Z only, or any combination of two or more items X, Y, and Z (e.g., XYZ, XY, YZ, XZ, and the like). Similar logic can be applied for two or more items in any occurrence of "at least one . . . " and "one or more . . . " language.

An aspect of the specification provides a device comprising: a photonic integrated circuit (PIC) chip comprising: an optical circuit; and an electrical interface configured to receive electrical signals for controlling the optical circuit; and, a common optical interface side of the PIC chip comprising: at least one input configured to receive light into the PIC chip to the optical circuit; and at least one output configured to convey at least one optical signal from the optical circuit out of the PIC chip, the electrical interface located on one or more electrical interface sides of the PIC chip different from the common optical interface side.

At least one of the one or more electrical interface sides of the PIC chip can be opposite the common optical interface side.

At least one of the one or more electrical interface sides of the PIC chip can be adjacent the common optical interface side.

The PIC chip can comprise a silicon PIC chip.

The at least one output of the common optical interface side can be configured to interface with one or more of: at least one optical fiber; at least one second PIC device; at least one lens; and at least one semiconductor device.

The optical circuit can comprise: an optical bus between the at least one input and the at least one output; and one or more optical ring resonators located on the optical bus.

The device can further comprise at least one laser aligned with the at least one input of the common optical interface side, the at least one laser configured to produce the light received at the at least one input. The light produced by the at least one laser can comprise a plurality of optical signals at different frequencies, and the optical circuit can comprise a plurality of optical ring resonators on an optical bus between the at least one input and the at least one output, in a one-to-one relationship with the plurality of optical signals.

The device can further comprise an electrical driver chip in communication with the electrical interface, and the electrical driver chip can be configured to produce the electrical signals for controlling the optical circuit.

The electrical interface can be configured to communicate with at least one electrical device that produces the electrical signals for controlling the optical circuit, the electrical signals received at the electrical interface.

The electrical interface can be configured to communicate with at least one electrical device that produces modulating signals for controlling the optical circuit, the electrical signals received at the electrical interface comprising the modulating signals produced by the at least one electrical device.

The device can further comprise a heater configured to heat optical circuit and one or more electrical traces between the heater and the electrical interface.

The device can further comprise: a voltage control device configured to control one or more voltages of the optical circuit; and one or more electrical traces between the voltage control device and the electrical interface.

BRIEF DESCRIPTIONS OF THE DRAWINGS

For a better understanding of the various implementations described herein and to show more clearly how they may be carried into effect, reference will now be made, by way of example only, to the accompanying drawings in which.

DETAILED DESCRIPTION

Figure 1:
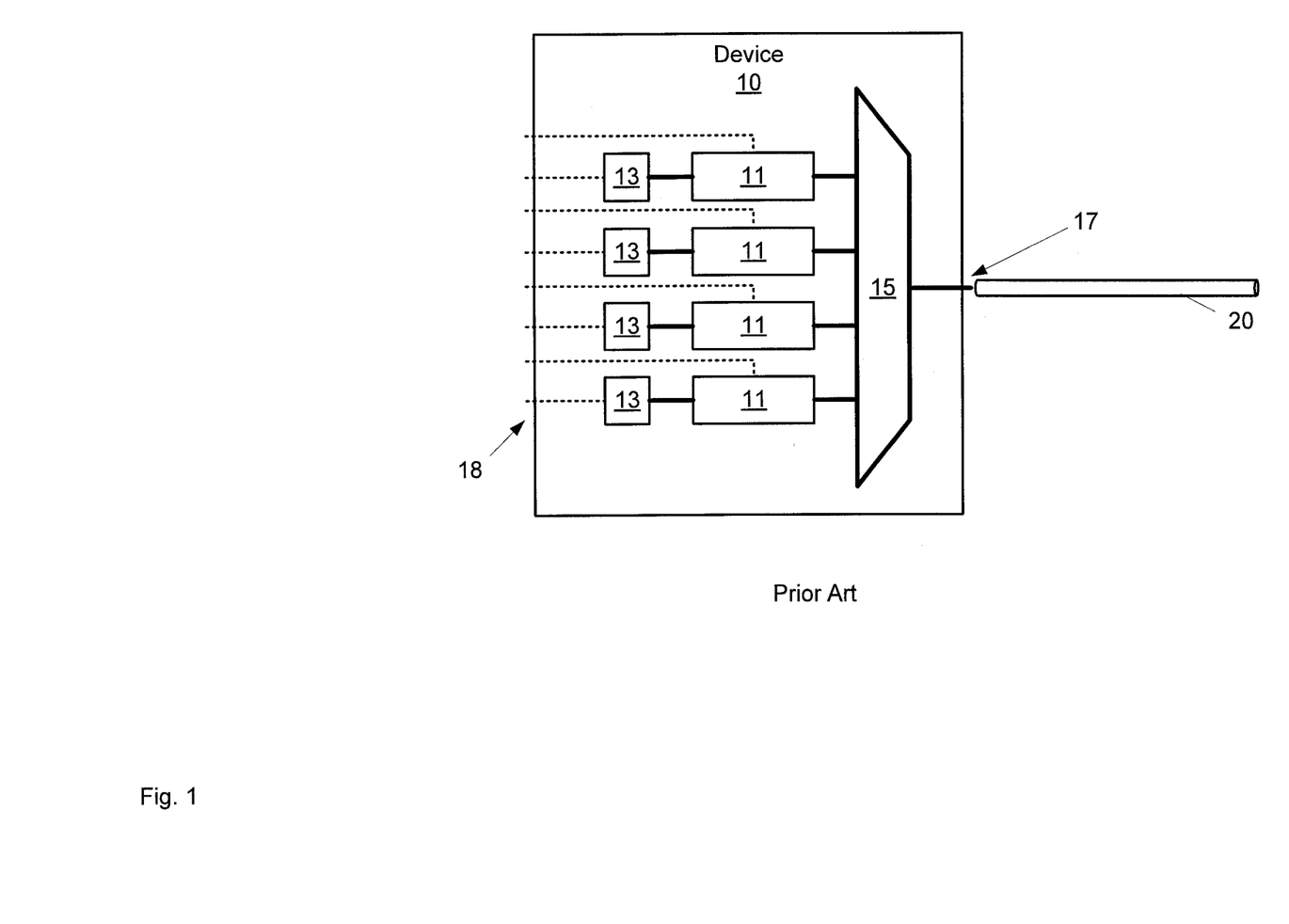
FIG. 1 depicts a schematic diagram of a prior art multiplexed optical transmit assembly.

Attention is first directed to FIG. 1 which depicts a device 10 comprising a multiplexed optical transmit assembly according to the prior art. Device 10 comprises a plurality of modulators 11, a plurality of laser diodes 13, an optical multiplexer 15, a light output 17 and an electrical interface 18. For clarity, optical waveguides and/or optical busses and/or optical paths between optical components are depicted using solid lines, while electrical connections in device 10 are depicted using stippled lines.

In general, each of plurality of laser diodes 13 is configured to produce light of a different frequency, the light from each laser diode 13 is output to a corresponding modulator 11; modulated light from each modulator 11 is output to optical multiplexer 15, which combines the modulated optical signals and outputs multiplexed modulated optical signals at light output 17, for example into an optical fiber 20, which conveys the combined modulated optical signals in a telecommunication system to a remote demux optical receive assembly for demultiplexing. While not depicted, electrical interface 18 is connected to an electrical device which produces signals for driving plurality of modulators 11 to modulated light from plurality of laser diodes 13. As depicted electrical interface 18 includes an electrical connection to each of plurality of laser diodes 13, which can add to the complexity of electrical interface 18, as well as wiring of device 10.

As is clearly depicted in FIG. 1, electrical interface 18 is on a same side as laser diodes 13, and light inputs to modulators 11 are on a side opposite output 17. Hence, in general light flows from left to right in FIG. 1. However, electrical connections from electrical interface 18 to modulators 11 must be routed around laser diodes 13. In other words, in device 10, laser diodes 13 are physically in the way of electrical connections between electrical interface 18 and modulators 11, which can make for bulky packaging.

Figure 2:
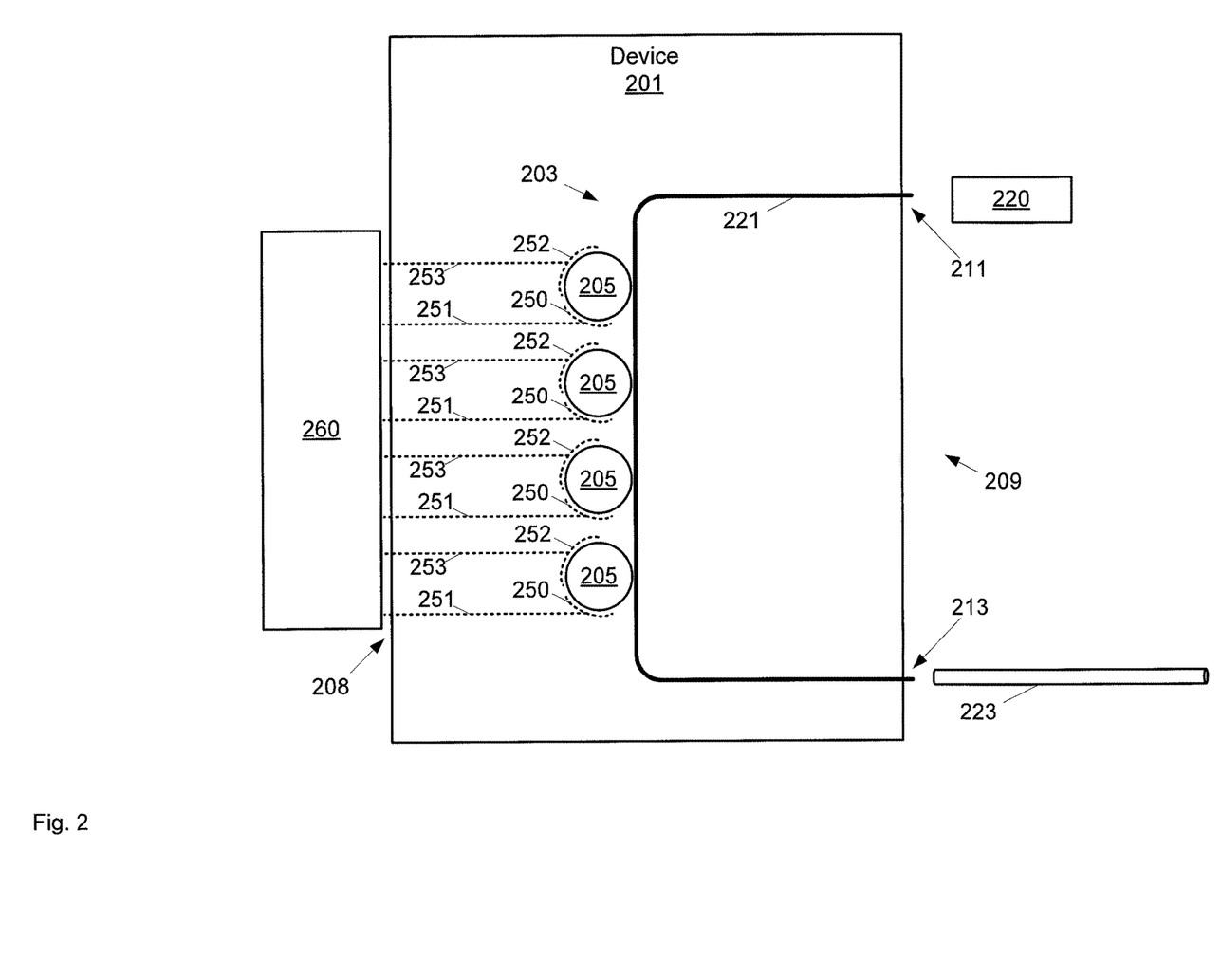
FIG. 2 depicts a schematic diagram of a device that includes a photonic integrated chip having a common optical edge interface, according to non-limiting implementations.

In contrast, attention is next directed to FIG. 2 which depicts a device 201 according to specific non-limiting implementations; device 201 comprises: a photonic integrated circuit (PIC) chip 203 which in turn comprises: one or more optical ring resonators 205 (e.g. which form an optical circuit); an electrical interface 208 configured to receive electrical signals for controlling one or more optical ring resonators 205; a common optical interface side 209 comprising: at least one input 211 configured to receive light into PIC chip 203 to one or more optical ring resonators 205; and at least one output 213 configured to convey at least one optical signal from the one or more optical ring resonators 205 out of PIC chip 203, and electrical interface 208 located on an electrical interface side of PIC chip 203 different from common optical interface side 209 and in particular electrical interface 208 is located on an electrical interface side of PIC chip 203 opposite common optical interface side 209. In other words, at least one input 211 and at least one output 213 are located on a same side (e.g. common optical interface side 209), and electrical interface 208 is located on a side opposite at least one input 211 and at least one output 213 and/or a side opposite common optical interface side 209. Put another way, at least one input 211 and at least one output 213 are located on a common optical edge of PIC chip 203 and/or optical interfaces for PIC chip 203 are located on a common edge of PIC chip 203. Furthermore, while only one input 211 and one output 213 are shown in device 201, in other implementations (e.g. see FIG. 3), device 201 can include more than one input 211 and/or more than one output 213, for example an optical input and optical output for each of optical ring resonators 205.

As depicted, device 201 further comprises, and/or is configured to interface with, a laser 220 laser aligned with at least one input 211 of common optical interface side 209, laser 220 configured to produce the light received at at least one input 211. In other words, in some implementations, laser 220 is integrated into device 201 while, in other implementations, laser 220 is external to device 201 but can be integrated into packaging common to device 201. When device 201 comprises more than one input 211, more than one laser can be used to input light and/or an optical signal into device 201, for example a laser for each optical input in a one-to-one relationship (e.g. while only one input 211 is depicted, device 201 can be adapted to receive light from a plurality of lasers (each can be similar to laser 220) and, in these implementations, device 201 can comprise a plurality of inputs (each similar to input 211) in one-to-one relationship with the plurality of lasers). However, in other implementations, laser 220 and/or a source of an optical signal (e.g. an optical transmitter and the like), can be remote to device 201 and conveyed to device 201 using an optical fiber; in these implementations at least one input 211 can be configured to interface with an optical fiber, similar to at least one optical output 213 as described below.

In some implementations, light produced by laser 220 comprises a plurality of optical signals at different frequencies, and device 201 further comprises a plurality of optical ring resonators 205 (e.g. including one or more optical ring resonators 205), on an optical bus 221 between at least one input 211 and at least one output 213, in a one-to-one relationship with the plurality of optical signals. Optical bus 221 can also be referred to as a waveguide.

For example, as depicted, device 201 comprises four optical ring resonators 205, each optical ring resonator 205 configured to modulate light and/or optical signals of different frequencies; hence it is assumed in FIG. 2 that laser 220 is configured to produce four optical signals at four different frequencies, all of which are received at at least one input 211 conveyed to optical ring resonators 205, where each optical ring resonator 205 modulates a respective optical signal, as described below. However, device 201 can comprise as few as one optical ring resonator 205, assuming that laser 220 produces only one optical signal of a given frequency; device 201 can alternatively comprise as many optical ring resonators 205 as there are different optical signals to be modulated, as produced by laser 220.

In any event, optical signals from each of one or more optical ring resonators 205 are conveyed out of PIC chip 203 by at least one output 213, for example to an optical fiber 223. Hence, at least one output 213 of common optical interface side 209 can be configured to interface with at least one optical fiber 223. While only a portion of optical fiber 223 is depicted, optical fiber 223 can be a component in an optical telecommunications network and can be tens to hundreds to thousands of kilometers long. Furthermore, when device 201 comprises more than one output 213, more than optical fiber can interface with device 201, for example an optical fiber for each optical output in a one-to-one relationship.

Alternatively, at least one output 213 of common optical interface side 209 can be configured to interface with one or more of: at least one optical fiber (such as optical fiber 223); at least one second PIC device; at least one lens; and at least one semiconductor device. In other words, while present implementations are described with respect to output being received at an optical fiber 223, in other implementations at least one output 213 can be adapted to output an optical signal to other devices, for example by adapting a connector thereto, and the like.

In general, optical bus 221 is between at least one input 211 and at least one output 213 of the common optical interface side 209, and one or more optical ring resonators 205 are located on optical bus 221. However, when device 201 comprises more than one input 211 more than one output 213, device 201 can comprise more than one optical bus.

Hence, in general, one or more optical ring resonators 205, optical bus 221, at least one input 211 and at least one output 213 are each PIC based components of PIC chip 203. In some implementations PIC chip 203 can comprise a silicon PIC chip, however PIC chip 203 can be manufactured from other materials suitable for photonic integrated circuits.

In general, device 201 further comprises one or more heaters 250 configured to heat one or more optical ring resonators 205 and one or more electrical traces 251 between the one or more heaters and electrical interface 208. While FIG. 2 depicts one or more heaters 250 in a one-to-one relationship with one or more optical ring resonators 205, in some implementations, device 201 can comprise one heater 250 common to all of one or more optical ring resonators 205.

In general, device 201 further comprises one or more voltage control devices 252 configured to control a voltage across one or more optical ring resonators 205 and one or more electrical traces 253 between one or more voltage control devices 252 and electrical interface 208. In general, voltage control devices 252 are provided in a one-to-one relationship with one or more optical ring resonators 205.

Both of one or more heaters 250 and one or more voltage control devices 252 are appreciated to be depicted schematically; for example, while both one or more heaters 250 and one or more voltage control devices 252 are depicted as being around a portion of an outside of a respective optical ring resonators 205, in practise, one or more heaters 250 and/or one or more voltage control devices 252 can be located inside a respective optical ring resonator 205 and/or in one or more planes adjacent a depicted plane of a respective optical ring resonator 205. For example, one or more voltage control devices 252 can comprise electrodes "above" and "below" a respective optical ring resonator 205 (e.g. out of and into the page of FIG. 2).

Indeed, it is appreciated that both of one or more heaters 250 and one or more voltage control devices 252 are components of one or more optical ring resonators 205; in general, one or more heaters 250 are used to tune one or more optical ring resonators 205 to a given respective frequency, while one or more voltage control devices 252 are used to change the optical properties of one or more optical ring resonators 205 between two different values to, in turn, modulate respective optical signals on optical bus 221.

As depicted, device 201 further comprises and/or is configured to interface with, an electrical driver chip 260 in communication with electrical interface 208, electrical driver chip 260 configured to produce the electrical signals for controlling one or more optical ring resonators 205. Put another way, electrical interface 208 is configured to communicate with at least one electrical device (e.g. electrical driver chip 260) that produces modulating signals for driving one or more optical ring resonators 205, the electrical signals received at electrical interface 208 comprising the modulating signals produced by the at least one electrical device. In some implementations, electrical driver chip 260 is integrated into device 201 while, in other implementations, electrical driver chip 260 is external to device 201 but can be integrated into packaging common to device 201. Electrical driver chip 260 can, in turn, be configured to interface with one or more devices that store and/or produce data to be transmitted and electrical driver chip 260 can receive and convert such data into electrical signals for controlling one or more optical modulators.

Hence, for example, respective modulating signals can be produced by electrical driver chip 260 for each of one or more optical ring resonators 205, received at respective electrical traces 253 and used to change a voltage across each of one or more optical ring resonators 205 which causes respective optical signals on optical bus 221 from laser 220 (and the like) to be modulated. The modulated optical signals can then be transmitted through an optical telecommunications system via optical fiber 223. When more than one optical signal is produced by laser 220 (and the like), more than one optical signal can be modulated by a respective optical ring resonator 205 resulting in multiplexed optical signals being transmitted through optical fiber 223.

Hence, device 201 can generally comprise a transmitter in an optical telecommunications system (e.g. an optical telecommunications receiver) configured to produce, and transmit, multiplexed modulated optical signals at one or more given optical frequencies (depending on the frequencies produced by laser 220), and one or more given data rates (depending on rates of modulation by one or more optical ring resonators), the modulated optical signals having data encoded therein. As such, the one or more given optical frequencies can comprise one or more given carrier optical frequencies including, but not limited to, optical frequencies used in optical telecommunications in a range of about 184.5-238 THz; however other optical frequencies are within the scope of present implementations. Furthermore, device 201 can further be used in and/or with other types of optical devices including, but not limited to ROADMs (reconfigurable optical add-drop multiplexers), tunable filters and/or any optical device that includes optical inputs and optical outputs; furthermore, optical signal sources (such as a laser 220), and the like can be remotely located.

Figure 3:
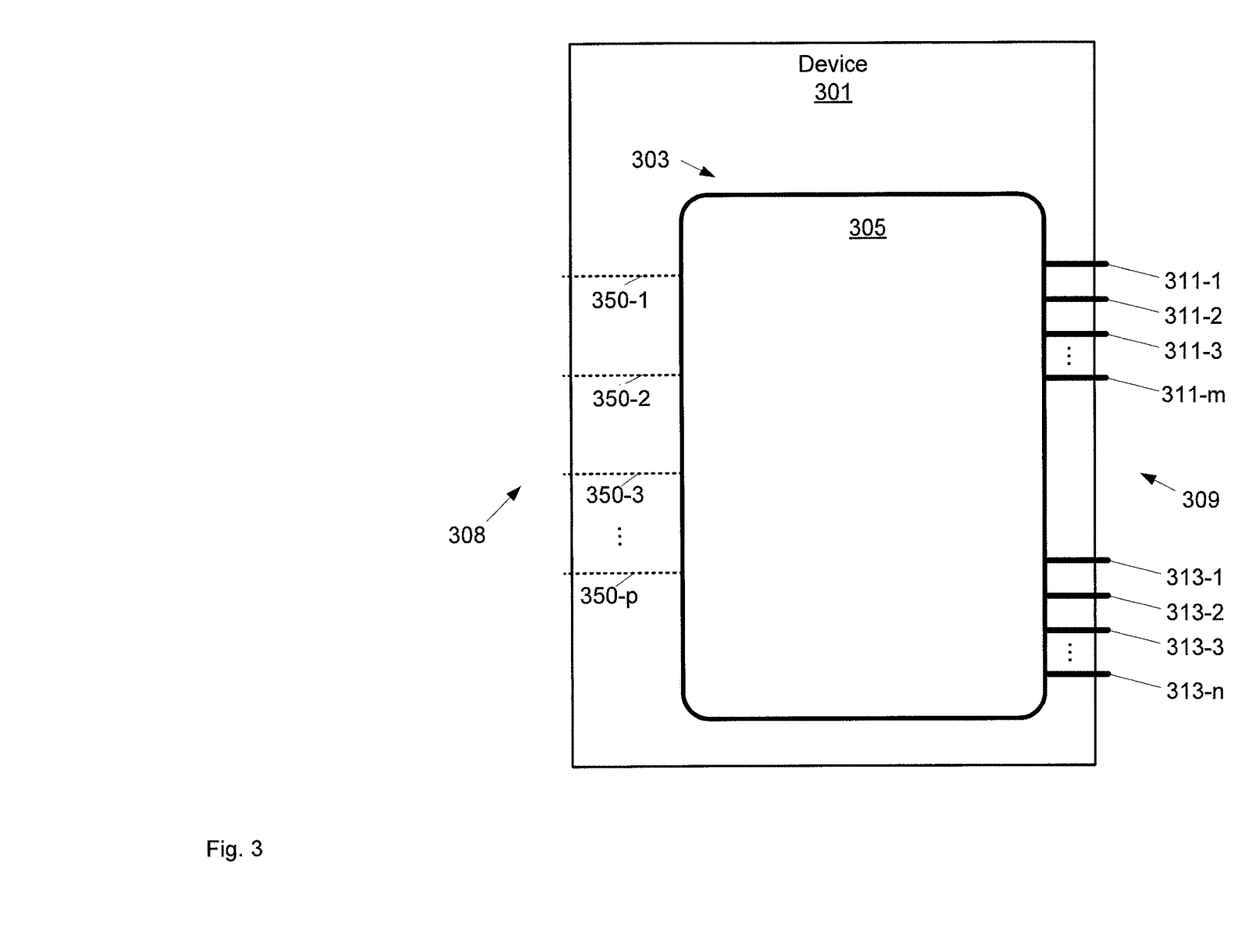
FIG. 3 depicts a schematic diagram of a device that includes a photonic integrated chip having a common optical edge interface, according to alternative non-limiting implementations.

Attention is next directed to FIG. 3 which depicts a device 301 according to specific non-limiting implementations; device 301 comprises: a photonic integrated circuit (PIC) chip 303 which in turn comprises: an optical circuit 305; an electrical interface 308 configured to receive electrical signals for controlling optical circuit 305; a common optical interface side 309 comprising: at least one input 311-1, 311-2, 311-3 . . . 311-$m$ configured to receive light into PIC chip 303 to optical circuit 305; and at least one output 313-1, 313-2, 313-3 . . . 313-$n$ configured to convey at least one optical signal from the optical circuit 305 out of PIC chip 303, and electrical interface 308 located on an electrical interface side of PIC chip 303 different from common optical interface side 309 and, in particular, opposite common optical interface side 309.

At least one input 311-1, 311-2, 311-3 . . . 311-$m$ will be interchangeably referred to hereafter, collectively, inputs 313 and, generically, as an input 311; and at least one output 313-1, 313-2, 313-3 . . . 313-$n$ will be interchangeably referred to hereafter, collectively, outputs 313 and, generically, as an output 313. Furthermore, while a number "m" of inputs 313, and a number "n" of outputs 313 are depicted, device 301 can comprise as few as one input 311 and/or one output 313. Furthermore, device 301 can comprise different number of each of inputs 313 and outputs 313 (e.g. "m" and "n" can be different numbers), or device 301 can comprise a same number of inputs 313 and outputs 313 (e.g. "m" can equal "n"). In general, a number of each of inputs 313 and outputs 313 can be determined by components of optical circuit 305 and/or by optical devices interfacing with common optical interface side 309 (e.g. lasers, light sources, optical fibers, and/or any other telecommunications components, and the like including, but not limited to one or more of: at least one optical fiber; at least one second PIC device; at least one lens; at least one semiconductor device and the like).

Indeed, while details of optical circuit 305 are not depicted, it is appreciated that optical circuit 305 can comprise any optical circuit compatible with PIC devices, and can include, but is not limited to, one or more optical ring resonators (e.g. as in device 201), one or more optical buses, one or more optical combiners (e.g. to combine light from one or more inputs 313, and/or to combine light for output at one or more outputs 313), one or more optical filters, one or more optical attenuator, one or more optical switches, one or more polarization control devices, and the like and/or any combination of such optical devices with optical ring resonators, light modulators and the like.

Similarly, electrical interface 308 comprises an electrical interface with optical circuit 305, for example to control optical devices in optical circuit; hence electrical interface 308 can comprise a plurality of connectors and/or connections to at least one electrical trace 350-1, 350-2, 350-3 . . . 350-$p$ (e.g. which can be similar to electrical traces 251, 253) which in turn convey electrical signal between electrical interface 308 and optical circuit 305. At least one electrical trace 350-1, 350-2, 350-3 . . . 350-$p$ will be interchangeably referred to hereafter, collectively, electrical traces 350 and, generically, as an electrical trace 350. Furthermore, while a number "p" of electrical traces 350 are depicted, a number of electrical traces 350 can depend on the components of optical circuit 305 which are being interfaced with using electrical interface 308; for example, when optical circuit 305 comprises one or more optical ring resonator, two electrical traces 350 can be included for each optical ring resonator of optical circuit 305. Regardless, electrical traces 350 represent an electrical circuit of PIC chip 303, which can have any suitable configuration compatible with optical circuit 305.

In general, as with device 201, at device 301 at least one input 311 and at least one output 313 are located on a same side (e.g. common optical interface side 309), and an electrical interface 308 is located on a side opposite at least one input 311 and at least one output 313 and/or a side opposite common optical interface side 309. Put another way, at least one input 311 and at least one output 313 are located on a common optical edge of PIC chip 303 and/or optical interfaces for PIC chip 303 are located on a common edge of PIC chip 303.

Hence, device 301 represents a more general implementation of device 201. As such, component of each can be similar. For example, PIC chip 303 can comprise a silicon PIC chip and/or a PIC chip made from any other suitable material. Similarly, at least one output 313 of common optical interface side 309 can be configured to interface with one or more of: at least one optical fiber (such as optical fiber 223); at least one second PIC device; at least one lens; and at least one semiconductor device; in general, the number of optical fibers can be in a one-to-one relationship with the number of outputs 313, such that one output 313 provides light to one external component.

Similarly, optical circuit 305 can comprise: an optical bus between at least one input 311 and at least one output 313; and one or more optical ring resonators located on the optical bus.

Device 301 can further comprise at least one laser (e.g. which can be similar to laser 220) aligned with at least one input 311 of common optical interface side 309, the at least one laser configured to produce the light received at the at least one input 311; in general, the number of lasers can be in a one-to-one relationship with the number of inputs 311, such that one laser provides light to one input 311. The light produced by the at least one laser can comprise a plurality of optical signals at different frequencies, and optical circuit 305 can comprises a plurality of optical ring resonators on an optical bus between the at least one input and the at least one output, in a one-to-one relationship with the plurality of optical signals. Alternatively, at least one input 311 can be configured to interface with an optical fiber to received optical signals from a remote laser and/or remote optical transmitter, and the like.

Device 301 can further comprise an electrical driver chip (e.g. which can be similar to electrical driver chip 260) in communication with the electrical interface 308, the electrical driver chip configured to produce the electrical signals for controlling optical circuit 305. In particular, electrical interface 308 is configured to communicate with at least one electrical device that produces electrical signals for controlling optical circuit 3-5, the electrical signals received at electrical interface 308.

For example, as with electrical interface 208 of device 201, Electrical interface 308 of device 301 can be configured to communicate with at least one electrical device that produces signals for controlling optical circuit 305, the electrical signals received at electrical interface 308 comprising the modulating signals produced by the at least one electrical device. However, such electrical signals can control optical filters, optical attenuators, optical switches, optical polarization devices, and/or one or more heaters thereof. Indeed, electrical signals received at electrical interface 308 generally control components of optical circuit 305.

Hence, as with device 201, device 301 can further comprise a heater configured to heat optical circuit 305 and one or more electrical traces (which can include one or more of electrical traces 350) between the heater and electrical interface 308). Similarly, device 301 can further comprise: a voltage control device configured to control one or more voltages of optical circuit 305; and one or more electrical traces (which can include one or more of electrical traces 350) between the heater and electrical interface 308) between the voltage control device and electrical interface 308.

In implementations described heretofore, an electrical interface of a PIC chip is located on a side opposite a common optical interface side. However, an electrical interface in implementations described herein can be located on one or more electrical interface sides of a PIC chip different from a common optical interface side, including opposite a common optical interface side and/or adjacent a common optical interface side.

Figure 4:
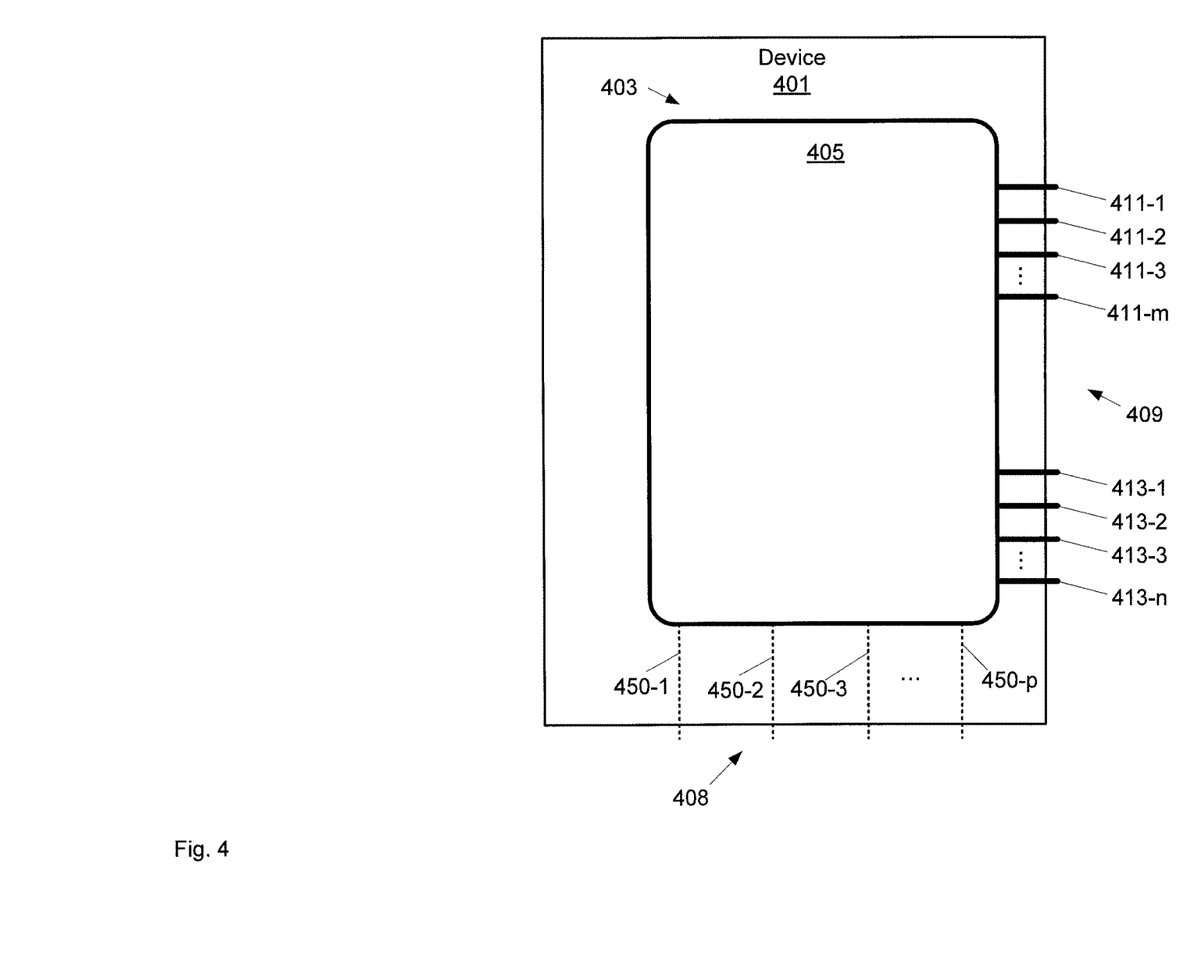
FIG. 4 depicts a schematic diagram of a device that includes a photonic integrated chip having a common optical edge interface, according to yet further alternative non-limiting implementations.

For example, attention is next directed to FIG. 4 which depicts a device 401 according to specific non-limiting implementations; device 401 comprises: a photonic integrated circuit (PIC) chip 403 which in turn comprises: an optical circuit 405; an electrical interface 408 configured to receive electrical signals for controlling optical circuit 405; a common optical interface side 409 comprising: at least one input 411-1, 411-2, 411-3 . . . 411-$m$ configured to receive light into PIC chip 403 to optical circuit 405; and at least one output 413-1, 413-2, 413-3 . . . 413-$n$ configured to convey at least one optical signal from the optical circuit 405 out of PIC chip 403, and electrical interface 408 located on an electrical interface side of PIC chip 403 different from common optical interface side 409 and, in particular, adjacent common optical interface side 409.

At least one input 411-1, 411-2, 411-3 . . . 411-$m$ will be interchangeably referred to hereafter, collectively, inputs 411 and, generically, as an input 411; and at least one output 413-1, 413-2, 413-3 . . . 413-$n$ will be interchangeably referred to hereafter, collectively, outputs 413 and, generically, as an output 413. Furthermore, while a number "m" of inputs 411, and a number "n" of outputs 413 are depicted, device 401 can comprise as few as one input 411 and/or one output 413. Furthermore, device 401 can comprise different number of each of inputs 411 and outputs 413 (e.g. "m" and "n" can be different numbers), or device 401 can comprise a same number of inputs 411 and outputs 413 (e.g. "m" can equal "n"). In general, a number of each of inputs 411 and outputs 413 can be determined by components of optical circuit 405 and/or by optical devices interfacing with common optical interface side 409, as described above.

Electrical interface 408 comprises an electrical interface with optical circuit 405, for example to control optical devices in optical circuit; hence electrical interface 408 can comprise a plurality of connectors and/or connections to at least one electrical trace 450-1, 450-2, 450-3 . . . 450-$p$ (e.g. which can be similar to electrical traces 251, 253) which in turn convey electrical signal between electrical interface 408 and optical circuit 405. At least one electrical trace 450-1, 450-2, 450-3 . . . 450-$p$ will be interchangeably referred to hereafter, collectively, electrical traces 450 and, generically, as an electrical trace 450. Furthermore, while a number "p" of electrical traces 450 are depicted, a number of electrical traces 450 can depend on the components of optical circuit 405 which are being interfaced with using electrical interface 408; for example, when optical circuit 405 comprises one or more optical ring resonator, two electrical traces 450 can be included for each optical ring resonator of optical circuit 405. Regardless, electrical traces 450 represent an electrical circuit of PIC chip 403, which can have any suitable configuration compatible with optical circuit 405.

Hence, in general, device 401 is similar to device 301, except that electrical interface 408 is located at an electrical interface side adjacent common optical interface side 409.

However, in yet further implementations, an electrical interface can be located on a plurality of sides of a PIC chip as long as each of the plurality of sides is different from the common optical interface side. For example, when a PIC chip is four-sided, the electrical interface can be located on three sides and the common optical interface side can comprise the fourth side, the electrical interface being located on the three sides that are not the common optical interface side.

Figure 5:
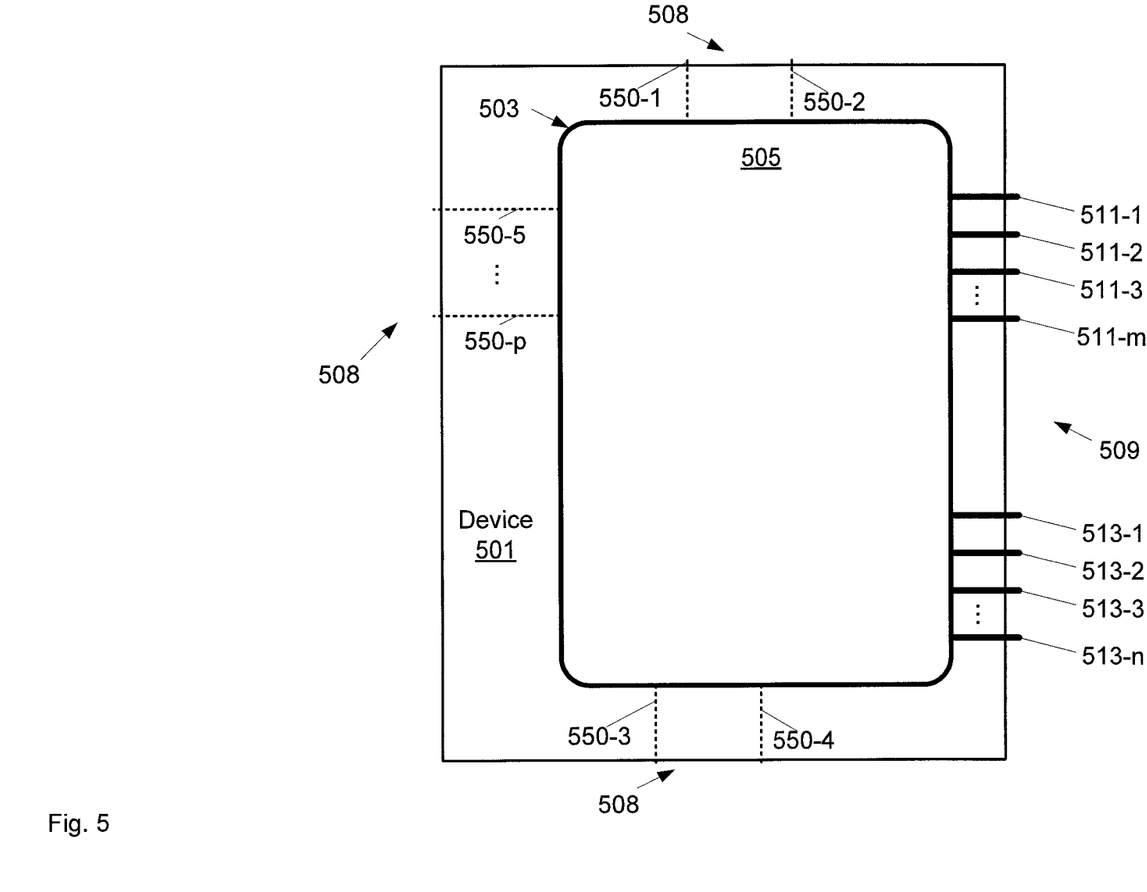
FIG. 5 depicts a schematic diagram of a device that includes a photonic integrated chip having a common optical edge interface, according to yet further alternative non-limiting implementations.

For example, attention is next directed to FIG. 5 which depicts a device 501 according to specific non-limiting implementations; device 501 comprises: a photonic integrated circuit (PIC) chip 503 which in turn comprises: an optical circuit 505; an electrical interface 508 configured to receive electrical signals for controlling optical circuit 505; a common optical interface side 509 comprising: at least one input 511-1, 511-2, 511-3 . . . 511-*m* configured to receive light into PIC chip 503 to optical circuit 505; and at least one output 513-1, 513-2, 513-3 . . . 513-*n* configured to convey at least one optical signal from the optical circuit 505 out of PIC chip 503, and electrical interface 508 located on a plurality of electrical interface sides of PIC chip 503 different from common optical interface side 509 and, in particular, at each side different common optical interface side 509, including an opposite side and adjacent sides, assuming that PIC chip 503 has four sides.

At least one input 511-1, 511-2, 511-3 . . . 511-*m* will be interchangeably referred to hereafter, collectively, inputs 511 and, generically, as an input 511; and at least one output 513-1, 513-2, 513-3 . . . 513-*n* will be interchangeably referred to hereafter, collectively, outputs 513 and, generically, as an output 513. Furthermore, while a number "m" of inputs 511, and a number "n" of outputs 513 are depicted, device 501 can comprise as few as one input 511 and/or one output 513. Furthermore, device 501 can comprise different number of each of inputs 511 and outputs 513 (e.g. "m" and "n" can be different numbers), or device 501 can comprise a same number of inputs and outputs 513 (e.g. "m" can equal "n"). In general, a number of each of inputs 511 and outputs 513 can be determined by components of optical circuit 505 and/or by optical devices interfacing with common optical interface side 509, as described above.

Electrical interface 508 comprises an electrical interface with optical circuit 505, for example to control optical devices in optical circuit; hence electrical interface 508 can comprise a plurality of connectors and/or connections to at least one electrical trace 550-1, 550-2, 550-3, 550-4, 550-5 . . . 550-*p* (e.g. which can be similar to electrical traces 251, 253) which in turn convey electrical signal between electrical interface 508 and optical circuit 505. At least one electrical trace 550-1, 550-2, 550-3, 550-4, 550-5 . . . 550-*p* will be interchangeably referred to hereafter, collectively, electrical traces 550 and, generically, as an electrical trace 550. Furthermore, while a number "p" of electrical traces 550 are depicted, a number of electrical traces 550 can depend on the components of optical circuit 505 which are being interfaced with using electrical interface 508; for example, when optical circuit 505 comprises one or more optical ring resonator, two electrical traces 550 can be included for each optical ring resonator of optical circuit 505. Regardless, electrical traces 550 represent an electrical circuit of PIC chip 503, which can have any suitable configuration compatible with optical circuit 505.

In particular, electrical interface 508 is located on at three electrical interface sides of PIC chip 503 different from common optical interface side 509; for example, two electrical interfaces (e.g. connectors and/or connections and the like) are located at each of electrical interface sides adjacent common optical interface side 509 (e.g. corresponding to electrical traces 550-1, 550-2 on a first adjacent electrical interface side and further corresponding to electrical traces 550-3, 550-4 on a second adjacent electrical interface side opposite the first adjacent electrical interface side); and the remainder of the electrical interfaces are located at an electrical interface side opposite common optical interface side 509 (e.g. corresponding to electrical traces 550-5 . . . 550-*p*).

Hence, in general, device 501 is similar to devices 301, 401 except that electrical interface 508 is located at three electrical interface sides each different from common optical interface side 509. A respective electrical connector can be used to connect to each of the three electrical interface sides, or one or more connectors can be used to connect to each of the three electrical interface sides; regardless, any electrical connector used to connect to the three electrical interface sides does not interfere with optical connections to the common optical interface side 509.

In any event, by integrating a PIC chip into an optical transmitter and/or other optical device, the transmitter and/or other optical device can be provided with optical interfaces on one side and an electrical interface on one or more different side, which can provide more versatility over non-PIC chip optical transmitters and/or other non-PIC chip optical devices and/or PIC chip optical devices with combined optical/electrical interfaces.

Persons skilled in the art will appreciate that there are yet more alternative implementations and modifications possible, and that the above examples are only illustrations of one or more implementations. The scope, therefore, is only to be limited by the claims appended hereto.

What is claimed is:

1. A device comprising:
a photonic integrated circuit (PIC) chip comprising:
an optical circuit; and
an electrical interface configured to receive electrical signals for controlling the optical circuit; and,
a common optical interface side of the PIC chip comprising: at least one input configured to receive light into the PIC chip to the optical circuit; and at least one output configured to convey at least one optical signal from the optical circuit out of the PIC chip, the electrical interface located on one or more electrical interface sides of the PIC chip different from the common optical interface side, wherein the electrical interface side of the PIC chip is opposite the common optical interface side.

2. The device of claim 1, wherein the PIC chip comprises a silicon PIC chip.

3. The device of claim 1, wherein the at least one output of the common optical interface side is configured to interface with one or more of: at least one optical fiber; at least one second PIC device; at least one lens; and at least one semiconductor device.

4. The device of claim 1, wherein the optical circuit comprises: an optical bus between the at least one input and the at least one output; and one or more optical ring resonators located on the optical bus.

5. The device of claim 1, further comprising at least one laser aligned with the at least one input of the common optical interface side, the at least one laser configured to produce the light received at the at least one input.

6. The device of claim 5, wherein the light produced by the at least one laser comprises a plurality of optical signals at different frequencies, and the optical circuit comprises a plurality of optical ring resonators on an optical bus between the at least one input and the at least one output, in a one-to-one relationship with the plurality of optical signals.

7. The device of claim 1, further comprising an electrical driver chip in communication with the electrical interface, the electrical driver chip configured to produce the electrical signals for controlling the optical circuit.

8. The device of claim 1, wherein the electrical interface is configured to communicate with at least one electrical device that produces the electrical signals for controlling the optical circuit, the electrical signals received at the electrical interface.

9. The device of claim 1, wherein the electrical interface is configured to communicate with at least one electrical device that produces modulating signals for controlling the optical circuit, the electrical signals received at the electrical interface comprising the modulating signals produced by the at least one electrical device.

10. The device of claim 1, further comprising a heater configured to heat optical circuit and one or more electrical traces between the heater and the electrical interface.

11. The device of claim 1, further comprising: a voltage control device configured to control one or more voltages of the optical circuit; and one or more electrical traces between the voltage control device and the electrical interface.

* * * * *